3,165,560
VINYL CHLORIDE POLYMER AND COPOLYMER COMPOSITIONS OF MATTER
Hans-Helmut Frey, Frankfurt am Main, Helmut Klug and Karl-Heinz Nittelberger, Gersthofen, near Augsburg, and Friedrich Nolte, Stadthergen, near Augsburg, Germany, assignors to Farbwerke Hoechst Aktiengesellschaft vormals Meister Lucius & Brüning, Frankfurt am Main, Germany, a corporation of Germany
No Drawing. Filed May 18, 1959, Ser. No. 813,682
Claims priority, application Germany May 24, 1958
5 Claims. (Cl. 260—897)

The present invention relates to elasticized polymers and copolymers of vinyl chloride and to a process for preparing same.

It is known to prepare chlorinated polyolefins by chlorinating polyolefins at temperatures of up to 90° C. in the presence of water. When such polyolefins which have been chlorinated in water are admixed with polymers containing vinyl chloride it will be observed that the properties of the polymers containing vinyl chloride are impaired. The properties may be impaired to such an extent that the milled sheets prepared from such mixtures or the pressed plates prepared from the milled sheets are so brittle as to break when exposed to the slightest impact whereas the vinyl chloride-containing polymers which are free from the above-mentioned additive break only when exposed to a stronger impact.

In the branches of industry in which polymers of vinyl chloride are worked up and applied one is interested in obtaining polymers of vinyl chloride having an improved impact strength and, moreover, one is interested in obtaining flexible foils that do not contain any of the usual plasticizers such as phthalic, phosphoric, adipic or sebacic acid esters. The use of plasticizers of this kind involves a number of disadvantages since these plasticizers have a marked volatility, exude, tend towards migration, are extractable, impair the electrical properties of the masses, etc.

When plasticizers of higher molecular weight are used the aforesaid troublesome phenomena are in part a little reduced but the small improvement obtainable by means of plasticizers of higher molecular weight is associated with a number of other disadvantages, for example the working up of the resulting mass is more difficult and its low temperature stability is reduced.

Plasticizers of high molecular weight such as copolymers of butadiene and acrylonitrile have the considerable disadvantage that the carbon double bonds they contain can easily lead to oxidation, decomposition and cross-linking reactions which render the working up of mixtures containing plasticizers of high molecular weight difficult or, if the reactions occur in a great measure, it is even impossible to work up the aforesaid mixtures. The plasticizers of high molecular weight furthermore have the drawback that for reasons of compatability they may only be added in exactly defined proportions so that masses containing these plasticizers may only be employed in a relatively narrow field.

Now we have found that polyolefins, especially polyethylene, preferably polyethylene prepared by a low pressure polymerization process and having for example a density within the range of 0.93–0.97, which have been chlorinated in water at a temperature above 90 to 100° C., preferably above 100 to 110° C. and suitably not above 150° C., for example by a process according to U.S. patent application Serial Number 643,499, filed on March 4, 1957, in the name of Helmut Klug et al., for "Manufacture of Chlorinated Polyethylene," produce excellent effects when mixed with polymers containing vinyl chloride. This is the more surprising since, as has already been mentioned, the effects produced by chlorinated polyolefins which have been prepared in water at a temperature below 90° C. are contrary to the effects obtained by the process of the invention.

The improvement of the notched-bar impact strength which is one of the improvements brought about by the process of the invention can be well determined. Masses obtained from mixtures of polymers containing vinyl chloride with chlorinated polyolefins prepared in water at a temperature below 90° C. have a notched-bar impact strength which is even lower than that of pure polymers containing vinyl chloride whereas masses obtained from mixtures of polymers containing vinyl chloride with chlorinated polyolefins prepared in water at temperatures above 90 to 100° C. have very high values of notched-bar impact strength.

The improvements brought about by means of the mixtures according to the invention may be determined not only by measuring the notched-bar impact strength but also by applying the methods of measurement by which an increase of the degree of elasticity and the toughness of the mixtures according to the invention as compared to the elasticity and toughness of polymers containing vinyl chloride but not containing an additive can be determined. The improvement of elasticity and toughness may, for example, be determined by measuring the impact strength which is especially improved at low temperatures, the bending strength, the tensile strength, the bursting strength, the modulus of elasticity or the modulus of torsion.

The mixtures according to the invention offer the special advantage that the components of the mixture possess a good compatibility so that they may be mixed in any desired proportion without giving rise to any considerable phenomena of incompatibility. Moreover, in contradistinction to the known mixtures of polyvinyl chloride and synthetic rubber, the mixtures according to the invention do not contain carbon double bonds and accordingly they do not present the above-mentioned disadvantages of mixtures containing components having double bonds.

By polymers containing vinyl chloride are here to be understood polyvinyl chloride and copolymers of vinyl chloride consisting mainly of vinyl chloride, that is to say copolymers containing more than 50% of vinyl chloride. As copolymerization components there may be mentioned by way of example: vinyl esters such as vinyl acetate, vinyl propionate, vinyl butyrate, vinyl stearate, vinylidene chloride, esters of aliphatic saturated alcohols containing 1 to 10 carbon atoms with acrylic acid, methacrylic acid or maleic acid.

By chlorinated polyolefins are to be understood chlorination products of polymers and copolymers of mono-olefins. As mono-olefins there may be mentioned by way of example ethylene, propylene, butylene and isobutylene. Chlorination products of polyethylene and of copolymers of ethylene with propylene have proved particularly useful. The process by which the polyolefins which after their chlorination are admixed with the polymers containing vinyl chloride have been prepared is not of fundamental importance. It is only necessary that the molecular weight of the polyolefins is sufficiently high.

Chlorination products of a polyethylene that has been prepared by a high pressure polymerization process, that is to say under a pressure of more than 1,000 atmospheres (gage) and at temperatures above 200° C. have, for example, proved useful.

Special effects are, however, obtained by the use of chlorination products of a polyethylene that has been prepared by a low pressure polymerization process, that is to say under a pressure of up to 100 atmospheres (gage) and at temperatures of up to 100° C., for example by the Ziegler-process. Chlorination products of the fraction of a low pressure copolymer of ethylene and propylene which is insoluble in aliphatic hydrocarbons boiling between 30 and 200° C. are particularly suitable.

The molecular weight of the polyolefins which are used in the form of their chlorination products for elasticizing the polymers containing vinyl chloride has a great influence on the properties of the mixtures according to the invention. The higher the molecular weight of the polyolefin, the more tough or elastic are the mixtures according to the invention.

As a relative measure for determining the molecular weight there may be applied the reduced viscosity which is determined in a solution of 0.5% strength of the polyolefin in tetrahydronaphthalene at 120° C.

We have found that chlorination products of polyolefins, more especially of polyethylene, are particularly suitable as mixing components in cases in which polyolefins having a reduced viscosity of more than 0.5, preferably more than 0.8 are used as starting material. Owing to their limited solubility in organic solvents these polyolefins can particularly advantageously be chlorinated in an aqueous suspension. When chlorination products of such polyolefins as have a reduced viscosity of less than 0.5 and an accordingly low molecular weight are admixed with polymers containing vinyl chloride they produce no effect at all or only a very poor effect.

The upper limit of the molecular weight is practically only determined by the polymerization process. Chlorination products of polyolefins of very high molecular weight have, however, the drawback of rendering the working up of the mixtures obtained by the process of the invention difficult. Chlorination products of such polyolefins as have a molecular weight higher than that corresponding to a reduced viscosity of 20 and more render the working up of the mixtures so difficult that such mixtures are less interesting for practical purposes. Polyolefins having a reduced viscosity of about 1 to about 10 have proved particularly suitable as starting materials for the preparation of the chlorination products to be used in the process of the invention.

The chlorine content of the chlorination products to be used in the process of the invention may vary within wide limits. Improved masses are, for example, already obtained when products containing no more than 20% of chlorine are admixed with polymers containing vinyl chloride. When chlorination products of polyolefins containing more than 50% of chlorine are added to the polymers containing vinyl chloride the resulting mixtures are improved to a small extent only. Products whose chlorine content is within the order of magnitude of the chlorine content of polyvinyl chloride are no longer capable of producing any effect. Chlorination products containing 30 to 45% of chlorine have proved particularly suitable. The optimum chlorine content depends to a low degree on the chlorination process. The chlorination process does, however, not essentially modify the efficiency of the products to be added in the process according to the invention.

The proportion in which the additive is admixed with the polymer containing vinyl chloride may vary within wide limits. Improvements can already be obtained by adding to the polymers containing vinyl chloride a quantity of 5% by weight or a little more than 5% of chlorination products of polyolefins. Mixtures consisting of 5 to 95% by weight of chlorination products of polyolefins can also be prepared without any difficulty. This enables masses of any desired degree of plasticity and elasticity to be prepared. Mixtures containing 10 to 50% by weight of chlorination products and 90 to 50% by weight of polymers containing vinyl chloride are particularly suitable.

As mixing components there are suitably used mixtures of chlorination products of polyolefins whose chlorine content may vary within the limits indicated above.

The polymers may be mixed with the additives by known methods.

As in the case of pure polyvinyl chloride it is also advantageous to use in these mixtures the stabilizers known for polyvinyl chloride, for example a metal soap, such as barium-cadmium laurate, a tin compound such as dibutyltin maleate, a lead compound such as the compound of the formula $3PbO.PbSO_4.H_2O$, organic compounds free from metal such as diphenylthio-urea. The stabilizers are generally used in an amount ranging from 1–10%, calculated on the weight of the total mixture. Peculiar, however, is the good thermostability, especially of mixtures with chlorination products of low pressure polyethylene.

It is furthermore possible, as already known for pure polyvinyl chloride, to admix 1–50%, preferably 1–30% of plasticizer such as dioctyl phthalate, dioctyl adipate, tricresyl phosphate, esters of adipic acid of high molecular weight, for example a condensation product of high molecular weight of adipic acid with hexane-diol, 1–50% of filling agent such as calcium carbonate or barium sulfate, 0.1–10% of an organic dye and 1–30% of an inorganic pigment, for example cadmium sulfide or iron oxide, in order to obtain special effects with mixtures of this kind. All percentage figures are calculated on the weight of the total mixture.

Depending on the portion of chlorinated polyolefins they contain the mixtures obtained by the process of the invention may be worked up into tubes, profiles, plates, foils, cables, pipes and articles obtained by injection-molding. For the mixtures may be adjusted to any desired degree of plasticity or elasticity ranging from that of the pure polymer containing vinyl chloride to that of a chlorinated polyolefin.

The following examples serve to illustrate the invention but they are not intended to limit it thereto.

EXAMPLE 1

Different polyethylenes obtained by a low pressure polymerization process in the presence of a catalyst consisting of titanium tetrachloride and an organo-aluminum compound are chlorinated in water at 60° C. until they contain the proportion of chlorine indicated in the table given below. As starting material for the chlorination there are used polyethylenes having reduced viscosities ($\eta$ red.) of 1.1, 2.3, 2.5 and 3.5 respectively. The reduced viscosity is determined in a solution of 0.5% strength in tetrahydronaphthalene at 120° C. In another case the same low pressure polyethylenes having reduced viscosities ($\eta$ red.) of 1.1, 2.5 and 3.5 respectively are chlorinated in water at 116° C. to the content of chlorine indicated in the table relating to this example. The values of notched-bar impact strength given in the table clearly show that the properties of products obtained from mixtures of polyethylene that has been chlorinated in water at a temperature above 90 to 100° C. with polyvinyl chloride obtained by suspension polymerization and having a K value of 70 are fundamentally different from the properties of mixtures of the same polyvinyl chloride with chlorination products of polyolefins which have been obtained by chlorinating polyethylene in water at temperatures below 90° C.

Table 1

| I Amount of polyvinyl chloride contained in the mixture, percent | II Amount of chlorinated polyethylene contained in the mixture, percent | III Temperature at which the polyethylene (col. II) was chlorinated in the presence of water, °C. | IV η red. of the polyethylene which was chlorinated according to col. III | V chlorine content of the chlorinated polyethylene | VI Notched bar impact strength at 20° C. (cm.kg./cm.²) |
|---|---|---|---|---|---|
| 80 | 20 | 60 | 1.1 | 29 | 2 |
| 80 | 20 | 60 | 2.3 | 22 | 3 |
| 80 | 20 | 60 | 2.5 | 36.5 | 3 |
| 80 | 20 | 60 | 3.5 | 45 | 4 |
| 80 | 20 | 116 | 1.1 | 16 | 19 |
| 80 | 20 | 116 | 1.1 | 44 | 45 |
| 80 | 20 | 116 | 2.5 | 44 | 45 |
| 80 | 20 | 116 | 3.5 | 45 | 49 |
| 100 | 0 | --------- | --------- | -------- | ¹4 |

¹ As a comparison.

EXAMPLE 2

A low pressure polyethylene prepared in the manner described in Example 1 and having a reduced viscosity ($\eta$ red.) of 1.7 is chlorinated at a temperature of 116° C. until its chlorine content amounts to 40%. The product so obtained is rolled for 15 minutes at 175° C. on a mixing roller and mixed in the proportions indicated in the table given below with a polyvinyl chloride obtained by suspension polymerization and having a K value of 70, 2% of barium cadmium laurate being added as a stabilizer. The rolled sheets are compressed at 170° C. to form plates of 4 mm. and 1 mm. thickness respectively which are found to have the following values of notched-bar impact strength, tensile strength and elongation at break.

Table 2

| Amount of polyvinyl chloride contained in the mixture, percent | Amount of chlorinated polyethylene contained in the mixture, percent | Notched-bar impact strength | | Tensile strength (kg./cm.²) | Elongation at break, percent |
| | | At 20° C. (cm. kg./cm.²) | At 0° C. (cm. kg./cm.²) | | |
|---|---|---|---|---|---|
| 95 | 5 | 4 | 3 | 550 | 30 |
| 90 | 10 | 6 | 4 | 360 | 35 |
| 85 | 15 | 32 | 6 | 335 | 40 |
| 80 | 20 | (¹) | 15 | 330 | 90 |
| 70 | 30 | (¹) | 16 | 270 | 125 |
| 60 | 40 | (¹) | 41 | 220 | 130 |
| 50 | 50 | (¹) | (¹) | 190 | 170 |
| 40 | 60 | (¹) | (¹) | 170 | 250 |
| 30 | 70 | (¹) | (¹) | 165 | 380 |
| 20 | 80 | (¹) | (¹) | 155 | 490 |
| 10 | 90 | (¹) | (¹) | 140 | 600 |

¹ No break.

EXAMPLE 3

Low pressure polyethylenes obtained in the manner described in Example 1 and having a reduced viscosity ($\eta$ red.) of 4.6 and 15 respectively are chlorinated in water at 116° C. to the content of chlorine indicated in the following table. The chlorination products are admixed on a roller and the rolled sheet is compressed under conditions analogous to those of Example 2. The following values of notched-bar impact strength, tensile strength and elongation at break are obtained:

Table 3

| Amount of polyvinyl chloride contained in the mixture, percent | Amount of chlorinated polyethylene contained in the mixture, percent | η red. of the polyethylene | Chlorine content of the chlorinated polyethylene | Notched-bar impact strength | | Tensile strength (kg./cm.²) | Elongation at break, percent |
| | | | | At 20° C. (cm. kg./cm.²) | At 0° C. (cm. kg./cm.²) | | |
|---|---|---|---|---|---|---|---|
| 90 | 10 | 4.6 | 32 | ---------- | 17 | 470 | 35 |
| 80 | 20 | 4.6 | 32 | No break | 45 | 330 | 75 |
| 65 | 35 | 4.6 | 32 | No break | 46 | 230 | 90 |
| 80 | 20 | 15 | 30 | No break | 13 | 340 | 90 |

We claim:

1. A composition of matter comprising (1) a member selected from the group consisting of polyvinyl chloride and a copolymer of vinyl chloride and a member selected from the group consisting of vinyl acetate, vinyl propionate, vinyl butrate, vinyl stearate, vinylidene chloride and esters of acrylic, methacrylic and maleic acid, said esters being formed with an aliphatic, saturated alcohol containing from 1 to 10 carbon atoms, said copolymer containing more than 50 percent vinyl chloride and (2) 10 to 50%, calculated upon the weight of the composition, of a chlorination product of the polymer selected from the group consisting of a homopolymer of an olefin having 2 to 4 carbon atoms and a copolymer whose monomers consist of mono-olefins having from 2 to 4 carbon atoms obtained by chlorination of said polymer suspended in water at a temperature within the range of 110° C. as the lower limit and 150° C. as the upper limit, said chlorination product having a chlorine content within the range of 30 to 45 percent by weight.

2. The composition of claim 1 wherein said chlorination product is prepared of a polyolefin which has a reduced viscosity in the range of 0.5 to 20 determined in a solution of 0.5% strength in tetrahydronaphthalene at 120° C.

3. The composition of claim 1 wherein said chlorination product is prepared of a polyolefin having a density in the range of 0.93 to 0.97.

4. The composition of claim 1 wherein said chlorination product is prepared of polyethylene having a density in the range of 0.93 to 0.97.

5. The composition of claim 1 wherein said chlorination product is the chlorination product of that fraction of a low pressure ethylene-propylene copolymer which is insoluble in aliphatic hydrocarbons boiling between 30° C. and 200° C.

References Cited in the file of this patent
UNITED STATES PATENTS

| | | |
|---|---|---|
| 2,592,763 | Taylor | Apr. 15, 1952 |
| 2,695,899 | Becker et al. | Nov. 30, 1954 |
| 2,737,502 | Land et al. | Mar. 6, 1956 |
| 2,897,176 | Rocky et al. | July 28, 1959 |
| 2,944,040 | Pollock et al. | July 5, 1960 |
| 3,006,889 | Frey | Oct. 31, 1961 |